(12) United States Patent
Chiyo et al.

(10) Patent No.: US 9,570,921 B2
(45) Date of Patent: Feb. 14, 2017

(54) POWER FEEDING COIL UNIT AND WIRELESS POWER TRANSMISSION DEVICE

(71) Applicant: TDK CORPORATION, Tokyo (JP)

(72) Inventors: Noritaka Chiyo, Tokyo (JP); Tetsuya Nishiyama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 51 days.

(21) Appl. No.: 14/548,950

(22) Filed: Nov. 20, 2014

(65) Prior Publication Data

US 2015/0145341 A1  May 28, 2015

(30) Foreign Application Priority Data

Nov. 28, 2013 (JP) ................................. 2013-246448
Sep. 29, 2014 (JP) ................................. 2014-198309

(51) Int. Cl.
| | |
|---|---|
| *H01F 27/24* | (2006.01) |
| *H02J 5/00* | (2016.01) |
| *H01F 27/38* | (2006.01) |
| *H01F 38/14* | (2006.01) |
| *H01F 3/10* | (2006.01) |

(52) U.S. Cl.
CPC ............... *H02J 5/005* (2013.01); *H01F 27/24* (2013.01); *H01F 27/38* (2013.01); *H01F 38/14* (2013.01); *H01F 3/10* (2013.01)

(58) Field of Classification Search
CPC ............................................ H01F 27/00–27/30
USPC .......... 336/65, 200, 232, 170, 173, 214–215
See application file for complete search history.

(56) References Cited

U.S. PATENT DOCUMENTS

| | | | |
|---|---|---|---|
| 4,873,677 A | 10/1989 | Sakamoto et al. | |
| 8,422,973 B2* | 4/2013 | Takarada | ................. H01Q 7/00 340/572.1 |
| 9,318,258 B2* | 4/2016 | Yamakawa | ............. H01F 38/14 |
| 2002/0079863 A1 | 6/2002 | Abe et al. | |
| 2012/0074899 A1 | 3/2012 | Tsai et al. | |

(Continued)

FOREIGN PATENT DOCUMENTS

| | | |
|---|---|---|
| JP | S64-23730 A | 1/1989 |
| JP | H06-225482 A | 8/1994 |

(Continued)

OTHER PUBLICATIONS

May 30, 2016 Office Action issued in Chinese Application No. 201410707722.0.

(Continued)

*Primary Examiner* — Tuyen Nguyen
(74) *Attorney, Agent, or Firm* — Oliff PLC (57) ABSTRACT

A power feeding coil unit includes a power feeding coil, and first and second auxiliary coils arranged so that a wire of the first auxiliary coil and a wire of the second auxiliary coil do not overlap a wire of the a power feeding coil when viewed from a direction perpendicular to an axial direction of the power feeding coil. A direction of circulation of a magnetic flux generated by the first auxiliary coil and a magnetic flux generated by the second auxiliary coil are opposite to a direction of circulation of a magnetic flux generated by the power feeding coil. An axes of the first and second auxiliary coils are substantially perpendicular to a power feeding direction of the power feeding coil, and are not aligned with the axis of the power feeding coil.

4 Claims, 7 Drawing Sheets

(56) References Cited

U.S. PATENT DOCUMENTS

| | | | |
|---|---|---|---|
| 2012/0119698 A1* | 5/2012 | Karalis | B60L 11/182 320/108 |
| 2013/0093253 A1* | 4/2013 | Norconk | H02J 5/005 307/104 |
| 2014/0084697 A1 | 3/2014 | Yasuda et al. | |

FOREIGN PATENT DOCUMENTS

| | | |
|---|---|---|
| JP | H09-74034 A | 3/1997 |
| JP | H09-283346 A | 10/1997 |
| JP | 2002-199598 A | 7/2002 |
| JP | 2010-172084 A | 8/2010 |
| JP | 2012-151311 A | 8/2012 |
| JP | 2013-039027 A | 2/2013 |
| JP | 2013-207727 A | 10/2013 |
| WO | 2013/172336 A1 | 11/2013 |
| WO | 2014/119296 A1 | 8/2014 |

OTHER PUBLICATIONS

May 19, 2015 Extended Search Report issued in European Patent Application No. 14194982.6.
Jun. 1, 2015 Extended Search Report issued in European Patent Application No. 14194935.4.
Jul. 1, 2016 Office Action Issued in U.S Appl. No. 14/548,420.
Jul. 5, 2016 Office Action Issued in U.S Appl. No. 14/549,118.
Jul. 18, 2016 Office Action issued in Chinese Application No. 201410714380.5.

* cited by examiner

POWER FEEDING COIL UNIT AND WIRELESS POWER TRANSMISSION DEVICE

BACKGROUND OF THE INVENTION

1. Field of the Invention

The present invention relates to a power feeding coil unit and a wireless power transmission device for wireless transmission of power.

2. Description of the Related Art

Wireless power transmission technology that utilizes an electromagnetic induction effect between a primary (power feeding) coil and a secondary (power receiving) coil that face each other to transmit power without any mechanical contact such as a cable has attracted attention recently. There has been an increasing demand for the development of a technology that allows high-efficiency and low-loss power transmission.

In this situation, the issue of an unwanted leakage magnetic field formed around the power feeding coil due to the leakage magnetic flux of the power feeding coil has been gaining attention. For example, in the application of wireless power transmission technology to chargers for power electronic devices such as electric vehicles, due to the demand for high-power transmission, a large current needs to flow through the power feeding coil. In this case, the strength of the unwanted leakage magnetic field due to the leakage magnetic flux also increases, raising a concern of potentially inducing electromagnetic interference which might affect nearby electronic equipment and so forth.

To address the issue described above, for example, Japanese Unexamined Patent Application Publication No. 09-74034 discloses a technique for eliminating or reducing noise caused by the leakage magnetic flux of a coil for power transmission by using a noise canceling coil that interlinks with the magnetic flux created by the coil for power transmission.

However, in the technique disclosed in Japanese Unexamined Patent Application Publication No. 09-74034, since the magnetic flux created by the coil for power transmission interlinks with the noise canceling coil, even a magnetic flux that would contribute to power transmission might also be canceled, resulting in a reduction in power transmission efficiency.

SUMMARY OF THE INVENTION

Accordingly, an embodiment of the present invention provides a power feeding coil unit and a wireless power transmission device to prevent or minimize a reduction in power transmission efficiency while reducing an unwanted leakage magnetic field formed in a location away from a power feeding coil.

A power feeding coil unit according to an aspect of the present invention is a power feeding coil unit for wirelessly feeding power. The power feeding coil unit includes a power feeding coil having a wire wound in a helical shape, and a first auxiliary coil and a second auxiliary coil, each having a wire wound in a helical shape. The first auxiliary coil and the second auxiliary coil are arranged so that the wire of the first auxiliary coil and the wire of the second auxiliary coil do not overlap the wire of the power feeding coil when viewed from a direction perpendicular to an axial direction of the power feeding coil. A direction of circulation of a magnetic flux generated by the first auxiliary coil and a magnetic flux generated by the second auxiliary coil are opposite to a direction of circulation of a magnetic flux generated by the power feeding coil. An axis of the first auxiliary coil and an axis of the second auxiliary coil are nonparallel to a power feeding direction of the power feeding coil, and are not aligned with an axis of the power feeding coil.

According to the aspect of the present invention, the axes of the first and second auxiliary coils are nonparallel to the power feeding direction of the power feeding coil, and a direction of circulation of the magnetic fluxes generated by the first and second auxiliary coils circulate are opposite to a direction of circulation of the magnetic flux generated by the power feeding coil. Accordingly, the magnetic flux generated by the power feeding coil and the magnetic fluxes generated by the first and second auxiliary coils cancel each other in a location away from the power feeding coil. As a result, an unwanted leakage magnetic field formed in a location away from a power feeding coil may be reduced. The term "power feeding direction", as used herein, refers to the opposing direction of a power feeding coil and a power receiving coil that is arranged to face the power feeding coil. Note that this opposing direction is a direction when a power feeding coil and a power receiving coil exactly face each other without any displacement therebetween.

In the power feeding coil unit according to the aspect of the present invention, furthermore, the first and second auxiliary coils are arranged so that the wires of the first and second auxiliary coils do not overlap the wire of power feeding coil when viewed from the direction perpendicular to the axial direction of the power feeding coil. The arrangement described above allows the magnetic fluxes generated by the first and second auxiliary coils to enhance a part of a magnetic field between the power feeding coil and the power receiving coil that is arranged to face the power feeding coil during power feeding. That is, the magnetic flux generated by the power feeding coil and the magnetic fluxes generated by the first and second auxiliary coils are oriented in substantially the same direction within a certain region between the power feeding coil and the power receiving coil, preventing a magnetic flux interlinking both the power feeding coil and the power receiving coil, which contributes to power transmission, from being canceled by the magnetic fluxes generated by the first and second auxiliary coils. As a result, a reduction in power transmission efficiency may be prevented or minimized.

In the power feeding coil unit according to the aspect of the present invention, furthermore, the axes of the first and second auxiliary coils are not aligned with the axis of the power feeding coil. The arrangement described above makes it difficult for the magnetic fluxes generated by the first and second auxiliary coils to interlink with the power feeding coil, preventing the magnetic flux generated by the power feeding coil, which contributes to power transmission, from being canceled by the magnetic flux generated by the first and second auxiliary coils. As a result, a reduction in power transmission efficiency may be prevented or minimized. Accordingly, a reduction in power transmission efficiency may be prevented or minimized with a reduction in an unwanted leakage magnetic field formed in a location away from a power feeding coil.

Preferably, the axes of the first and second auxiliary coils are substantially perpendicular to the power feeding direction of the power feeding coil. That is, the axes of the first and second auxiliary coils are substantially perpendicular to the opposing direction of the power feeding coil and the power receiving coil. In this case, the first and second auxiliary coils more facilitate the generation of a magnetic flux that circulates also in a location away from the first and second auxiliary coils. As a result, the effect of reducing an unwanted leakage magnetic field formed in a location away from a power feeding coil may further be enhanced.

Preferably, the first and second auxiliary coils are located on a rear side of the power feeding coil. That is, the first and second auxiliary coils are arranged on the opposite to a side of the power feeding coil facing the power receiving coil. In this case, the first and second auxiliary coils more easily generate a magnetic flux that enhances a part of a magnetic field between the power feeding coil and the power receiving coil. That is, the magnetic flux generated by the power feeding coil and the magnetic flux generated by the first and second auxiliary coils are oriented in substantially the same direction between the power feeding coil and the power receiving coil. Accordingly, a magnetic flux interlinking both the power feeding coil and the power receiving coil, which contributes to power transmission, is not canceled by the magnetic flux generated by the first and second auxiliary. This may more prevent or minimize a reduction in power transmission efficiency.

More preferably, the power feeding coil includes a magnetic core, each of the first and second auxiliary coils includes a magnetic core, the magnetic core of the first auxiliary coil is coupled to the magnetic core of the power feeding coil, and the magnetic core of the second auxiliary coil is coupled to the magnetic core of the power feeding coil. In this case, the first and second auxiliary coils more easily generate a magnetic flux that enhances a part of a magnetic field between the power feeding coil and the power receiving coil. That is, the magnetic flux generated by the power feeding coil and the magnetic flux generated by the first and second auxiliary coils are oriented in substantially the same direction between the power feeding coil and the power receiving coil. This may more reliably prevent or minimize a reduction in power transmission efficiency.

A wireless power transmission device according to another aspect of the present invention includes the power feeding coil unit described above, and a power receiving coil that is a helical-shaped coil including a magnetic core and a wire wound around the magnetic core. According to the aspect of the present invention, it may be possible to provide a wireless power transmission device that prevents or minimizes a reduction in power transmission efficiency while reducing an unwanted leakage magnetic field formed in a location away from a power feeding coil.

According to some aspects of the present invention, therefore, it may be possible to provide a power feeding coil unit and a wireless power transmission device that prevent or minimize a reduction in power transmission efficiency while reducing an unwanted leakage magnetic field formed in a location away from a power feeding coil.

DESCRIPTION OF THE PREFERRED EMBODIMENTS

An embodiment of the present invention will be described in detail with reference to the drawings. In the following description, substantially the same elements or elements having substantially the same function are given the same numerals or signs, and are not described again.

Figure 1:
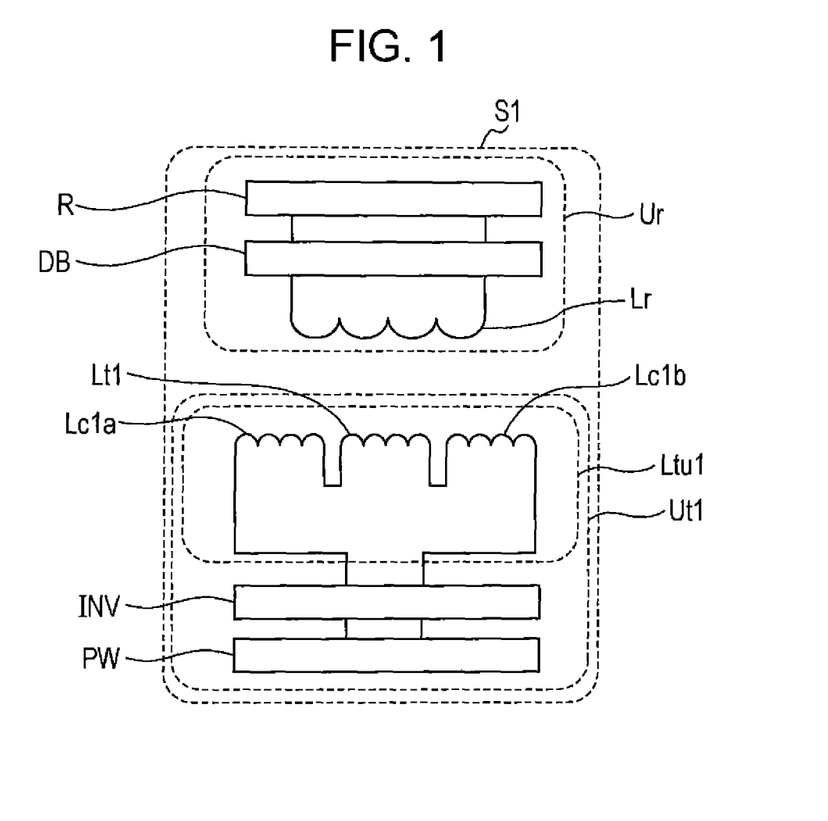
FIG. 1 is a system configuration diagram illustrating a wireless power transmission device according to a preferred embodiment of the present invention together with a load.
Figure 2:
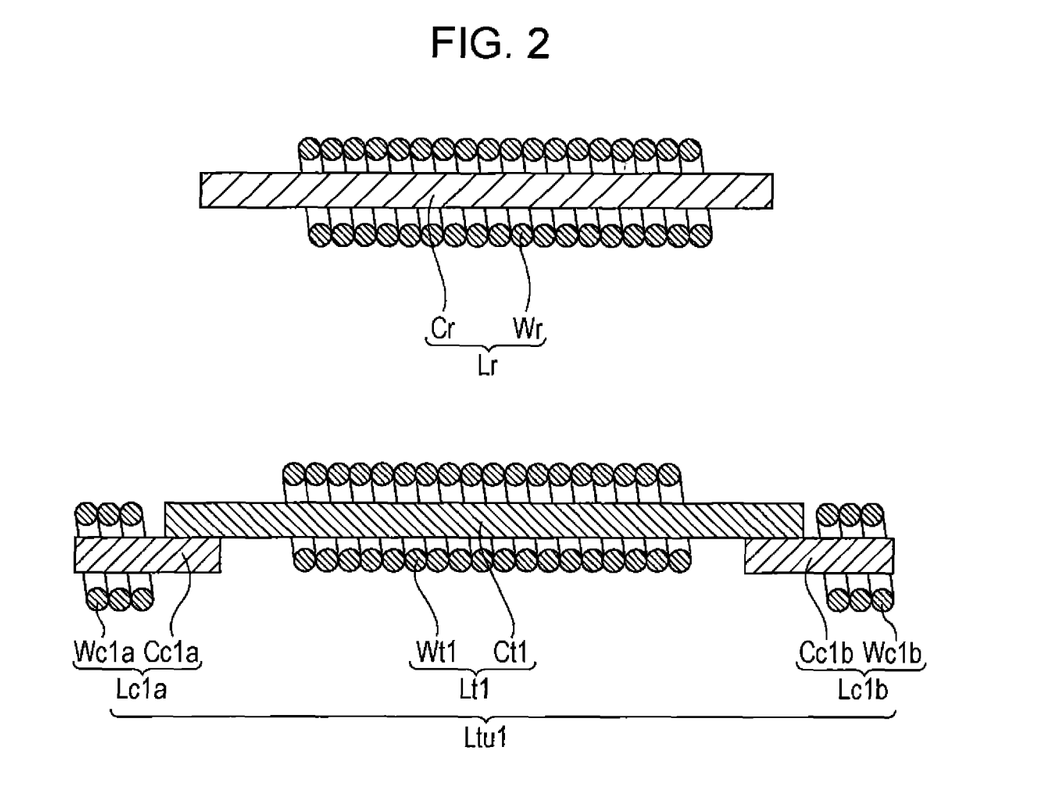
FIG. 2 is a cross-sectional view illustrating a power feeding coil unit according to the preferred embodiment of the present invention together with a power receiving coil.

First, a configuration of a wireless power transmission device S1 according to a preferred embodiment of the present invention will be described with reference to FIGS. 1 and 2. FIG. 1 is a system configuration diagram illustrating a wireless power transmission device according to the preferred embodiment of the present invention together with a load. FIG. 2 is a cross-sectional view illustrating a power feeding coil unit according to the preferred embodiment of the present invention together with a power receiving coil.

As illustrated in FIG. 1, the wireless power transmission device S1 includes a wireless power feeding device Ut1 and a wireless power receiving device Ur.

The wireless power feeding device Ut1 includes a power source PW, an inverter INV, and a power feeding coil unit Ltu1. The wireless power receiving device Ur includes a power receiving coil Lr and a rectifier circuit DB.

The power source PW supplies direct-current (DC) power to the inverter INV, described below. The power source PW is not limited to any particular one, and may be any power source that outputs DC power. Examples of such a power source may include a DC power source that is generated by rectifying and smoothing a commercial alternating-current (AC) power source, a secondary battery, a solar photovoltaic DC power source, and a switching power source device such as a switching converter.

The inverter INV has a function to convert input DC power supplied from the power source PW into AC power. In this embodiment, the inverter INV converts input DC power supplied from the power source PW into AC power, and supplies the AC power to the power feeding coil unit Ltu1 described below. The inverter INV may be implemented as a switching circuit having a plurality of switching elements bridge-connected. Examples of the switching elements of the switching circuit may include metal oxide semiconductor-field effect transistor (MOSFET) elements and insulated gate bipolar transistor (IGBT) elements.

As illustrated in FIG. 1, the power feeding coil unit Ltu1 includes a power feeding coil Lt1, a first auxiliary coil Lc1a, and a second auxiliary coil Lc1b. In this embodiment, as illustrated in FIG. 1, three coils, that is, the power feeding coil Lt1 and the first and second auxiliary coils Lc1a and Lc1b, are electrically connected in series with one another. In a case where the wireless power transmission device S1 according to this embodiment is used for an electric power supply facility for a vehicle such as an electric vehicle, the power feeding coil unit Ltu1 will be installed in or on, or near, the ground.

The individual coils included in the power feeding coil unit Ltu1 will now be described with reference to FIG. 2. The power feeding coil Lt1 includes a magnetic core Ct1 and a wire Wt1. The power feeding coil Lt1 is a solenoid coil wound in a helical shape, and is formed by winding the wire Wt1, which is made of a Litz wire such as a copper wire or an aluminum wire, around the magnetic core Ct1, which is shaped into a plate or a bar. The axial direction of the power feeding coil Lt1 is perpendicular to the opposing direction of the power feeding coil Lt1 and the power receiving coil Lr described below. The number of turns of the power feeding coil Lt1 is appropriately set on the basis of the separation distance between the power feeding coil Lt1 and the power receiving coil Lr described below, the desired power transmission efficiency, and so forth.

The first auxiliary coil Lc1a includes a magnetic core Cc1a and a wire Wc1a. The first auxiliary coil Lc1a is a solenoid coil wound in a helical shape, and is formed by winding the wire Wc1a, which is made of a Litz wire such as a copper wire or an aluminum wire, around the magnetic core Cc1a, which is shaped into a plate or a bar. The axial direction of the first auxiliary coil Lc1a is nonparallel to the power feeding direction of the power feeding coil Lt1. That is, the axial direction of the first auxiliary coil Lc1a is nonparallel to the opposing direction of the power feeding coil Lt1 and the power receiving coil Lr described below. The term "power feeding direction", as used herein, refers to the opposing direction of a power feeding coil and a power receiving coil that is arranged to face the power feeding coil. Note that this opposing direction is a direction when a power feeding coil and a power receiving coil exactly face each other without any displacement therebetween. The configuration described above allows the magnetic flux generated by the first auxiliary coil Lc1a to easily circulate also in a location away from the first auxiliary coil Lc1a without interlinking with the power receiving coil Lr described below. In this embodiment, the axial direction of the first auxiliary coil Lc1a is perpendicular to the opposing direction of the power feeding coil Lt1 and the power receiving coil Lr described below. Accordingly, the first auxiliary coil Lc1a more facilitates the generation of a magnetic flux circulating also in a location away from the first auxiliary coil Lc1a.

In addition, the first auxiliary coil Lc1a is located on the rear side of the power feeding coil Lt1. That is, the first auxiliary coil Lc1a is arranged on the opposite to a side of the power feeding coil Lt1 facing the power receiving coil Lr described below. The arrangement described above allows the first auxiliary coil Lc1a to easily generate a magnetic flux that enhances a magnetic field between the power feeding coil Lt1 and the power receiving coil Lr described below. That is, the magnetic flux generated by the power feeding coil Lt1 and the magnetic flux generated by the first auxiliary coil Lc1a are oriented in substantially the same direction between the power feeding coil Lt1 and the power receiving coil Lr described below. Accordingly, the magnetic flux interlinking both the power feeding coil Lt1 and the power receiving coil Lr described below, which contributes to power transmission, is not canceled by the magnetic flux generated by the first auxiliary coil Lc1a. As a result, a reduction in power transmission efficiency may further be prevented or minimized.

Furthermore, the direction of circulation of the magnetic flux generated by the first auxiliary coil Lc1a is opposite to the direction of circulation of the magnetic flux generated by the power feeding coil Lt1. Here, in this embodiment, the axial direction of the first auxiliary coil Lc1a is parallel to the axial direction of the power feeding coil Lt1. Thus, in order to make the direction of circulation of the magnetic flux generated by the first auxiliary coil Lc1a opposite to the direction of circulation of the magnetic flux generated by the power feeding coil Lt1, it may be sufficient that the direction of the magnetic field generated by the first auxiliary coil Lc1a is opposite to the direction of the magnetic field generated by the power feeding coil Lt1. That is, in a case where the first auxiliary coil Lc1a and the power feeding coil Lt1 are wound in the same direction, it may be sufficient to electrically connect the first auxiliary coil Lc1a and the power feeding coil Lt1 to each other so that the direction of the current flowing in the first auxiliary coil Lc1a and the direction of the current flowing in the power feeding coil Lt1 are opposite to each other. Alternatively, in a case where the first auxiliary coil Lc1a and the power feeding coil Lt1 are wound in opposite directions, it may be sufficient to electrically connect the first auxiliary coil Lc1a and the power feeding coil Lt1 to each other so that the direction of the current flowing in the first auxiliary coil Lc1a and the direction of the current flowing in the power feeding coil Lt1 are the same. In addition, the axis of the first auxiliary coil Lc1a is not aligned with the axis of the power feeding coil Lt1. Here, the magnetic flux interlinking the first auxiliary coil Lc1a and the magnetic flux interlinking the power feeding coil Lt1 are oriented in opposite directions. Thus, if the magnetic flux generated by the first auxiliary coil Lc1a interlinks with the power feeding coil Lt1, the magnetic flux might cancel a magnetic flux that contributes to power transmission. In this embodiment, since the axis of the first auxiliary coil Lc1a is not aligned with the axis of the power feeding coil Lt1, it is difficult for the magnetic flux generated by the first auxiliary coil Lc1a to interlink with the power feeding coil Lt1. As a result, the magnetic flux interlinking both the power feeding coil Lt1 and the power receiving coil Lr described below, which contributes to power transmission, is not canceled by the magnetic flux generated by the first auxiliary coil Lc1a. Accordingly, a reduction in power transmission efficiency may be prevented or minimized.

The second auxiliary coil Lc1b includes a magnetic core Cc1b and a wire Wc1b. The second auxiliary coil Lc1b is a solenoid coil wound in a helical shape, and is formed by winding the wire Wc1b, which is made of a Litz wire such as a copper wire or an aluminum wire, around the magnetic core Cc1b, which is shaped into a plate or a bar. The axial direction of the second auxiliary coil Lc1b is nonparallel to the power feeding direction of the power feeding coil Lt1. That is, the axial direction of the second auxiliary coil Lc1b is nonparallel to the opposing direction of the power feeding coil Lt1 and the power receiving coil Lr described below. The configuration described above allows the magnetic flux generated by the second auxiliary coil Lc1b to easily circulate also in a location away from the second auxiliary coil Lc1b without interlinking with the power receiving coil Lr described below. In this embodiment, the axial direction of the second auxiliary coil Lc1b is perpendicular to the opposing direction of the power feeding coil Lt1 and the power receiving coil Lr described below. Accordingly, the second auxiliary coil Lc1b more facilitates the generation of a magnetic flux circulating also in a location away from the second auxiliary coil Lc1b.

In addition, the second auxiliary coil Lc1b is located on the rear side of the power feeding coil Lt1. That is, the second auxiliary coil Lc1b is arranged on the opposite to the side of the power feeding coil Lt1 facing the power receiving coil Lr described below. The arrangement described above allows the second auxiliary coil Lc1b to easily generate a magnetic flux that enhances a magnetic field between the power feeding coil Lt1 and the power receiving coil Lr described below. That is, the magnetic flux generated by the power feeding coil Lt1 and the magnetic flux generated by the second auxiliary coil Lc1$b$ are oriented in substantially the same direction between the power feeding coil Lt1 and the power receiving coil Lr described below. Accordingly, the magnetic flux interlinking both the power feeding coil Lt1 and the power receiving coil Lr described below, which contributes to power transmission, is not canceled by the magnetic flux generated by the second auxiliary coil Lc1$b$. As a result, a reduction in power transmission efficiency may further be prevented or minimized.

Furthermore, the direction of circulation of the magnetic flux generated by the second auxiliary coil Lc1$b$ is opposite to the direction of circulation of the magnetic flux generated by the power feeding coil Lt1. Here, in this embodiment, the axial direction of the second auxiliary coil Lc1$b$ is parallel to the axial direction of the power feeding coil Lt1. Thus, in order to make the direction of circulation of the magnetic flux generated by the second auxiliary coil Lc1$b$ opposite to the direction of circulation of the magnetic flux generated by the power feeding coil Lt1, it may be sufficient that the direction of the magnetic field generated by the second auxiliary coil Lc1$b$ is opposite to the direction of the magnetic field generated by the power feeding coil Lt1. That is, in a case where the second auxiliary coil Lc1$b$ and the power feeding coil Lt1 are wound in the same direction, it may be sufficient to electrically connect the second auxiliary coil Lc1$b$ and the power feeding coil Lt1 to each other so that the direction of the current flowing in the second auxiliary coil Lc1$b$ and the direction of the current flowing in the power feeding coil Lt1 are opposite to each other. Alternatively, in a case where the second auxiliary coil Lc1$b$ and the power feeding coil Lt1 are wound in opposite directions, it may be sufficient to electrically connect the second auxiliary coil Lc1$b$ and the power feeding coil Lt1 to each other so that the direction of the current flowing in the second auxiliary coil Lc1$b$ and the direction of the current flowing in the power feeding coil Lt1 are the same. In addition, the axis of the second auxiliary coil Lc1$b$ is not aligned with the axis of the power feeding coil Lt1. Here, the magnetic flux interlinking the second auxiliary coil Lc1$b$ and the magnetic flux interlinking the power feeding coil Lt1 are oriented in opposite directions. Thus, if the magnetic flux generated by the second auxiliary coil Lc1$b$ interlinks with the power feeding coil Lt1, the magnetic flux might cancel a magnetic flux that contributes to power transmission. In this embodiment, since the axis of the second auxiliary coil Lc1$b$ is not aligned with the axis of the power feeding coil Lt1, it is difficult for the magnetic flux generated by the second auxiliary coil Lc1$b$ to interlink with the power feeding coil Lt1. As a result, the magnetic flux interlinking both the power feeding coil Lt1 and the power receiving coil Lr described below, which contributes to power transmission, is not canceled by the magnetic flux generated by the second auxiliary coil Lc1$b$. Accordingly, a reduction in power transmission efficiency may be prevented or minimized.

Here, when the power feeding coil unit Ltu1 is viewed from the power receiving coil Lr described below, the first auxiliary coil Lc1$a$ and the second auxiliary coil Lc1$b$ are arranged so as to be located on both outer sides of the power feeding coil Lt1 in the axial direction of the power feeding coil Lt1. With the configuration described above, the first auxiliary coil Lc1$a$ and the second auxiliary coil Lc1$b$ are arranged so that the wires Wc1$a$ and Wc1$b$ of the first and second auxiliary coils Lc1$a$ and Lc1$b$ do not overlap the wire Wt1 of the power feeding coil Lt1 when viewed from any direction perpendicular to the axial direction of the power feeding coil Lt1. As described above, the axial direction of the first and second auxiliary coils Lc1$a$ and Lc1$b$ is parallel to the axial direction of the power feeding coil Lt1, and the direction of circulation of the magnetic flux generated by the first and second auxiliary coils Lc1$a$ and Lc1$b$ is opposite to the direction of circulation of the magnetic flux generated by the power feeding coil Lt1. Thus, the magnetic flux generated by the first and second auxiliary coils Lc1$a$ and Lc1$b$ enhances a part of the magnetic field between the power feeding coil Lt1 and the power receiving coil Lr described below. That is, the magnetic flux generated by the power feeding coil Lt1 and the magnetic flux generated by the first auxiliary coil Lc1$a$ are oriented in substantially the same direction, and the magnetic flux generated by the power feeding coil Lt1 and the magnetic flux generated by the second auxiliary coil Lc1$b$ are oriented in substantially the same direction between the power feeding coil Lt1 and the power receiving coil Lr described below. Accordingly, the magnetic flux interlinking both the power feeding coil Lt1 and the power receiving coil Lr described below, which contributes to power transmission, is not canceled by the magnetic flux generated by the first and second auxiliary coils Lc1$a$ and Lc1$b$. As a result, a reduction in power transmission efficiency may be prevented or minimized.

In addition, as illustrated in FIG. 2, the magnetic core Ct1 of the power feeding coil Lt1 is connected to each of the magnetic core Cc1$a$ of the first auxiliary coil Lc1$a$ and the magnetic core Cc1$b$ of the second auxiliary coil Lc1$b$ near either end of the opposite surface to a side of the magnetic core Ct1 closer to the power receiving coil Lr described below (i.e., the lower surface in FIG. 2) in the opposing direction of the power feeding coil Lt1 and the power receiving coil Lr described below. The configuration described above allows the magnetic core Cc1$a$ of the first auxiliary coil Lc1$a$ and the magnetic core Cc1$b$ of the second auxiliary coil Lc1$b$ to be coupled to the magnetic core Ct1 of the power feeding coil Lt1. Thus, the first auxiliary coil Lc1$a$ more easily generates a magnetic flux that enhances a magnetic field between the power feeding coil Lt1 and the power receiving coil Lr described below, and the second auxiliary coil Lc1$b$ more easily generates a magnetic flux that enhances a magnetic field between the power feeding coil Lt1 and the power receiving coil Lr described below.

Next, the configuration of the wireless power receiving device Ur will be described. As illustrated in FIG. 2, the power receiving coil Lr includes a magnetic core Cr and a wire Wr. The power receiving coil Lr is a solenoid coil wound in a helical shape, and is formed by winding the wire Wr around the magnetic core Cr, which is shaped into a plate or a bar. The power receiving coil Lr has a function to receive the AC power fed from the power feeding coil Lt1 of the power feeding coil unit Ltu1. In a case where the wireless power transmission device S1 according to this embodiment is used for an electric power supply facility for a vehicle such as an electric vehicle, the power receiving coil Lr will be mounted on the bottom of the vehicle.

The rectifier circuit DB has a function to rectify the AC power received by the power receiving coil Lr to DC power. Examples of the rectifier circuit DB may include a converter circuit having a full-wave rectifying function that uses a diode bridge and a power smoothing function that uses a capacitor and a three-terminal regulator. The DC power obtained by rectification by the rectifier circuit DB is output to a load R. Examples of the load R may include, in a case where the wireless power transmission device S1 according to this embodiment is used for an electric power supply facility for a vehicle such as an electric vehicle, a secondary battery and a rotating machine that are included in the vehicle. In a case where the load R is an AC rotating machine, the wireless power receiving device Ur will require an additional inverter (not illustrated) between the rectifier circuit DB and the load R to supply AC power to the AC rotating machine.

Figure 3A:
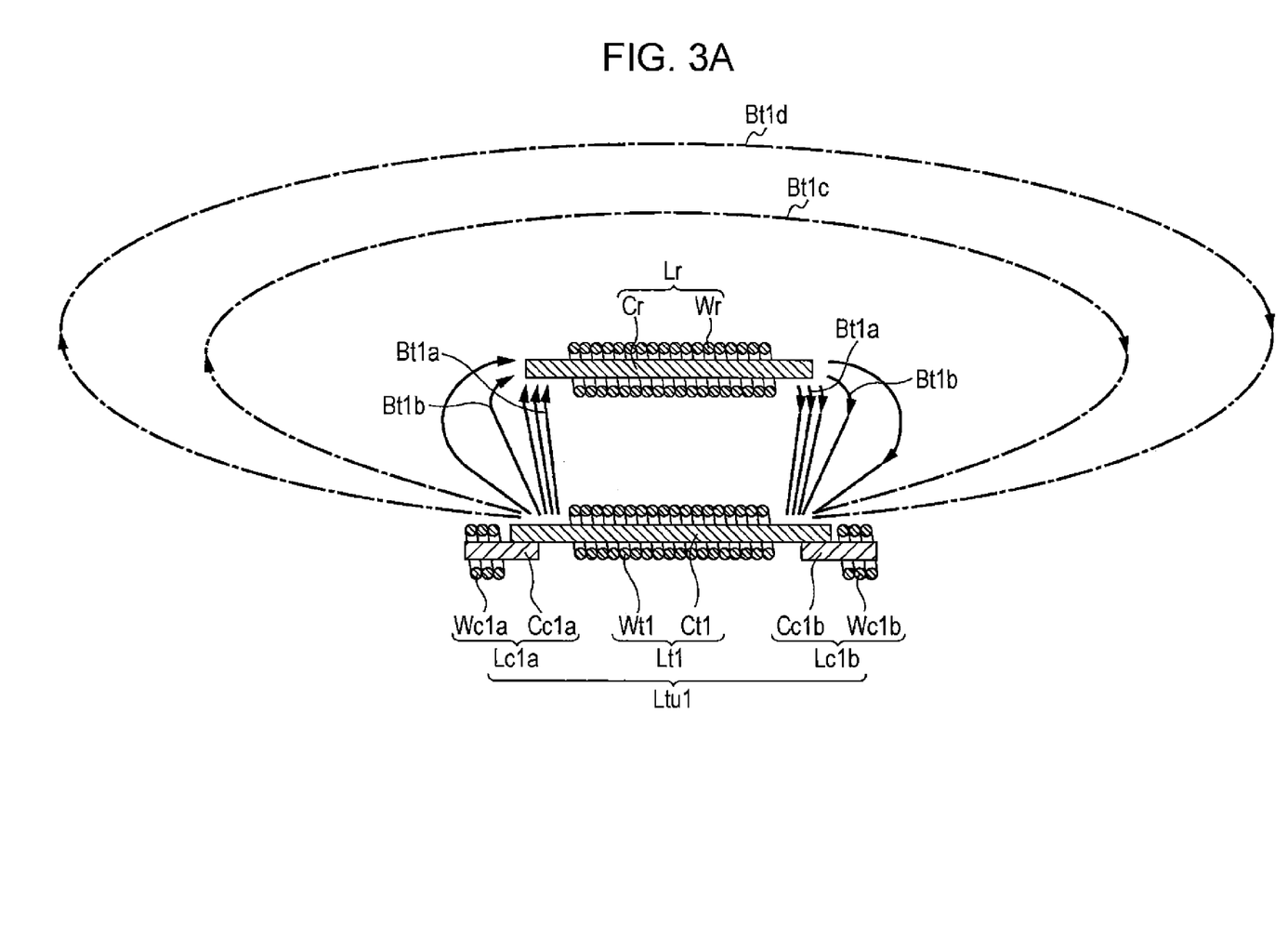
FIG. 3A is a diagram schematically illustrating the magnetic flux generated by a power feeding coil in FIG. 2.
Figure 3B:
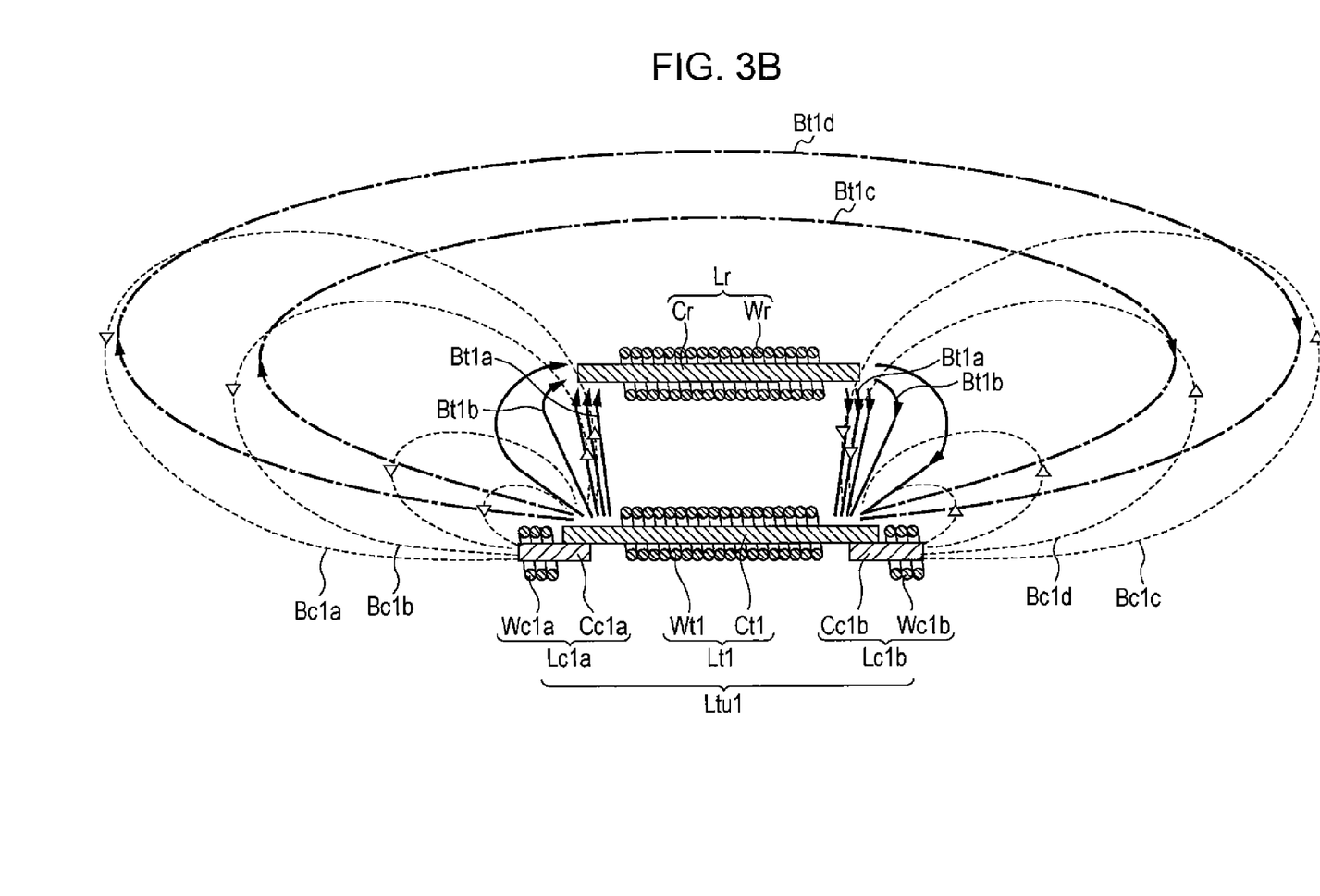
FIG. 3B is a diagram schematically illustrating the magnetic flux generated by the power feeding coil and first and second auxiliary coils in FIG. 2.

The relative relationship between the magnetic flux generated by a power feeding coil and the magnetic flux generated by an auxiliary coil and the effect of reducing the unwanted leakage magnetic field in this embodiment will now be described in detail with reference to FIGS. 3A and 3B. FIG. 3A is a diagram schematically illustrating the magnetic flux generated by the power feeding coil Lt1 in FIG. 2. FIG. 3B is a diagram schematically illustrating the magnetic flux generated by the power feeding coil Lt1 and the first and second auxiliary coils Lc1a and Lc1b in FIG. 2. In FIG. 3A, magnetic fluxes Bt1a to Bt1d are illustrated as typical magnetic fluxes generated by the power feeding coil Lt1. In FIG. 3B, magnetic fluxes Bt1a to Bt1d are illustrated as typical magnetic fluxes generated by the power feeding coil Lt1, and magnetic fluxes Bc1a to Bc1d are schematically illustrated as typical magnetic fluxes generated by the first and second auxiliary coils Lc1a and Lc1b. Note that the illustrated magnetic fluxes schematically depict only the orientations of the individual magnetic fluxes, and do not depict the magnetic flux densities. In FIG. 3A and FIG. 3B, the magnetic flux in the magnetic core Ct1 of the power feeding coil Lt1, the magnetic cores Cc1a and Cc1b of the first and second auxiliary coils Lc1a and Lc1b, and the magnetic core Cr of the power receiving coil Lr is not illustrated.

First, the magnetic flux generated by the power feeding coil Lt1 will be described with reference to FIG. 3A. As illustrated in FIG. 3A, the power feeding coil Lt1 generates the magnetic fluxes Bt1a to Bt1d that interlink the power feeding coil Lt1 in the direction from the power feeding coil Lt1 to the first auxiliary coil Lc1a (i.e., horizontally leftward in FIG. 3A). In the illustrated example, the magnetic fluxes Bt1a to Bt1d generated by the power feeding coil Lt1 include magnetic fluxes Bt1a and Bt1b that interlink with the power receiving coil Lr and that contribute to power transmission, and magnetic fluxes Bt1c and Bt1d that circulate in a location away from the power feeding coil Lt1 without interlinking with the power receiving coil Lr. The interlinking of the magnetic fluxes Bt1a and Bt1b with the power receiving coil Lr induces an electromotive force in the wire Wr of the power receiving coil Lr. The power generated in the power receiving coil Lr is rectified by the rectifier circuit DB, and is output to the load R. Since the magnetic fluxes Bt1a to Bt1d generated by the power feeding coil Lt1 do not interlink with the first and second auxiliary coils Lc1a and Lc1b, and the magnetic fluxes Bt1a and Bt1b, which contribute to power transmission, are not canceled out using the first and second auxiliary coils Lc1a and Lc1b. Thus, a reduction in power transmission efficiency may be prevented or minimized.

The magnetic flux generated by the first and second auxiliary coils Lc1a and Lc1b will now be described with reference to FIG. 3B. The magnetic fluxes Bt1a to Bt1d generated by the power feeding coil Lt1 in FIG. 3B are as illustrated in FIG. 3A. As illustrated in FIG. 3B, the first auxiliary coil Lc1a generates magnetic fluxes Bc1a and Bc1b that interlink the first auxiliary coil Lc1a in the direction from the first auxiliary coil Lc1a to a center portion of the power feeding coil Lt1 (i.e., horizontally rightward in FIG. 3B) and that do not interlink with the power feeding coil Lt1 and circulate in the direction from the power feeding coil Lt1 to the power receiving coil Lr (i.e., vertically upward in FIG. 3B). Specifically, in this embodiment, since the axial direction of the first auxiliary coil Lc1a is nonparallel to the opposing direction of the power feeding coil Lt1 and the power receiving coil Lr, the magnetic fluxes Bc1a and Bc1b generated by the first auxiliary coil Lc1a circulate in a location away from the first auxiliary coil Lc1a without interlinking with the power receiving coil Lr. In particular, in this embodiment, since the axial direction of the first auxiliary coil Lc1a is perpendicular to the opposing direction of the power feeding coil Lt1 and the power receiving coil Lr, the magnetic fluxes Bc1a and Bc1b generated by the first auxiliary coil Lc1a largely circulate also in a location away from the first auxiliary coil Lc1a. In addition, since the axis of the first auxiliary coil Lc1a is not aligned with the axis of the power feeding coil Lt1, the magnetic fluxes Bc1a and Bc1b generated by the first auxiliary coil Lc1a do not interlink with the power feeding coil Lt1.

Likewise, as illustrated in FIG. 3B, the second auxiliary coil Lc1b generates magnetic fluxes Bc1c and Bc1d that interlink the second auxiliary coil Lc1b in the direction from the center portion of the power feeding coil Lt1 to the second auxiliary coil Lc1b (i.e., horizontally rightward in FIG. 3B) and that do not interlink with the power feeding coil Lt1 and circulate in the direction from the power receiving coil Lr to the power feeding coil Lt1 (i.e., vertically downward in FIG. 3B). Specifically, in this embodiment, since the axial direction of the second auxiliary coil Lc1b is nonparallel to the opposing direction of the power feeding coil Lt1 and the power receiving coil Lr, the magnetic fluxes Bc1c and Bc1d generated by the second auxiliary coil Lc1b circulate in a location away from the second auxiliary coil Lc1b without interlinking with the power receiving coil Lr. In particular, in this embodiment, since the axial direction of the second auxiliary coil Lc1b is perpendicular to the opposing direction of the power feeding coil Lt1 and the power receiving coil Lr, the magnetic fluxes Bc1c and Bc1d generated by the second auxiliary coil Lc1b largely circulate also in a location away from the second auxiliary coil Lc1b. In addition, since the axis of the second auxiliary coil Lc1b is not aligned with the axis of the power feeding coil Lt1, the magnetic fluxes Bc1c and Bc1d generated by the second auxiliary coil Lc1b do not interlink with the power feeding coil Lt1.

Next, the effect of reducing the unwanted leakage magnetic field in this embodiment will be described. As described above, the power feeding coil Lt1 generates the magnetic fluxes Bt1c and Bt1d that circulate in a location away from the power feeding coil Lt1. The magnetic fluxes Bt1c and Bt1d do not contribute to power transmission, and become magnetic fluxes that form an unwanted leakage magnetic field around the power feeding coil Lt1. In this embodiment, the direction of circulation of the magnetic fluxes Bc1a and Bc1b generated by the first auxiliary coil Lc1a and the direction of circulation of the magnetic fluxes Bc1c and Bc1d generated by the second auxiliary coil Lc1b are opposite to the direction of circulation of the magnetic fluxes Bt1a to Bt1d generated by the power feeding coil Lt1. Accordingly, as illustrated in FIG. 3B, the magnetic fluxes Bt1c and Bt1d generated by the power feeding coil Lt1 and the magnetic fluxes Bc1a to Bc1d generated by the first and second auxiliary coils Lc1a and Lc1b are oriented in opposite directions in a location away from the power feeding coil Lt1. That is, the magnetic fluxes Bt1c and Bt1d generated by the power feeding coil Lt1 are canceled by the magnetic fluxes Bc1a to Bc1d generated by the first and second auxiliary coils Lc1a and Lc1b in a location away from the power feeding coil Lt1. As a result, the unwanted leakage magnetic field may be reduced.

On the other hand, the magnetic fluxes Bt1a and Bt1b generated by the power feeding coil Lt1 and the magnetic fluxes Bc1a and Bc1b generated by the first auxiliary coil Lc1a are oriented in substantially the same direction in the vicinity of the power feeding coil Lt1. That is, the magnetic field generated by the first auxiliary coil Lc1a enhances a part of the magnetic field between the power feeding coil Lt1 and the power receiving coil Lr. In this manner, the magnetic fluxes Bt1a and Bt1b generated by the power feeding coil Lt1 and the magnetic fluxes Bc1a and Bc1b generated by the first auxiliary coil Lc1a are oriented in substantially the same direction between the power feeding coil Lt1 and the power receiving coil Lr. Accordingly, the magnetic fluxes Bt1a and Bt1b interlinking both the power feeding coil Lt1 and the power receiving coil Lr, which contribute to power transmission, are not canceled by the magnetic fluxes Bc1a and Bc1b generated by the first auxiliary coil Lc1a. As a result, a reduction in power transmission efficiency may be prevented or minimized. Similarly, the magnetic fluxes Bt1a and Bt1b generated by the power feeding coil Lt1 and the magnetic fluxes Bc1c and Bc1d generated by the second auxiliary coil Lc1b are oriented in substantially the same direction in the vicinity of the power feeding coil Lt1. That is, the magnetic field generated by the second auxiliary coil Lc1b enhances a part of the magnetic field between the power feeding coil Lt1 and the power receiving coil Lr. In this manner, the magnetic fluxes Bt1a and Bt1b generated by the power feeding coil Lt1 and the magnetic fluxes Bc1c and Bc1d generated by the second auxiliary coil Lc1b are oriented in substantially the same direction between the power feeding coil Lt1 and the power receiving coil Lr. Accordingly, the magnetic fluxes Bt1a and Bt1b interlinking both the power feeding coil Lt1 and the power receiving coil Lr, which contribute to power transmission, are not canceled by the magnetic fluxes Bc1c and Bc1d generated by the second auxiliary coil Lc1b. As a result, a reduction in power transmission efficiency may be prevented or minimized.

In this manner, the magnetic fluxes Bc1a to Bc1d generated by the first and second auxiliary coils Lc1a and Lc1b do not cancel the magnetic fluxes Bt1a and Bt1b that is generated by the power feeding coil Lt1 and is interlinking with the power receiving coil Lr, and the magnetic flux Bc1a to Bc1d generated by the first and second auxiliary coil Lc1a and Lc1b cancel the magnetic flux Bt1c and Bt1d that is generated by the power feeding coil Lt1 and is not interlinking with the power receiving coil Lr. This may prevent or minimize a reduction in power transmission efficiency while reducing an unwanted leakage magnetic field formed in a location away from the power feeding coil Lt1.

In the manner described above, in the power feeding coil unit Ltu1 according to this embodiment, the axes of the first and second auxiliary coils Lc1a and Lc1b are nonparallel to the power feeding direction of the power feeding coil Lt1, and the direction of circulation of the magnetic fluxes Bc1a to Bc1d generated by the first and second auxiliary coils Lc1a and Lc1b is opposite to the direction of circulation of the magnetic fluxes Bt1a to Bt1d generated by the power feeding coil Lt1. Accordingly, the magnetic fluxes Bt1c and Bt1d generated by the power feeding coil Lt1 and the magnetic fluxes Bc1a to Bc1d generated by the first and second auxiliary coils Lc1a and Lc1b cancel each other out in a location away from the power feeding coil Lt1. As a result, a reduction in the unwanted leakage magnetic field formed in a location away from the power feeding coil Lt1 may be achieved.

In the power feeding coil unit Ltu1 according to this embodiment, furthermore, the first and second auxiliary coils Lc1a and Lc1b are arranged so that the wires Wc1a and Wc1b of the first and second auxiliary coils Lc1a and Lc1b do not overlap the wire Wt1 of the power feeding coil Lt1 when viewed from a direction perpendicular to the axial direction of the power feeding coil Lt1. The arrangement described above allows the magnetic fluxes Bc1a to Bc1d generated by the first and second auxiliary coils Lc1a and Lc1b to enhance a part of the magnetic field between the power feeding coil Lt1 and the power receiving coil Lr. That is, the magnetic fluxes Bt1a and Bt1b generated by the power feeding coil Lt1 and the magnetic fluxes Bc1a to Bc1d generated by the first and second auxiliary coils Lc1a and Lc1b are oriented in substantially the same direction within a certain region between the power feeding coil Lt1 and the power receiving coil Lr, preventing the magnetic fluxes Bt1a and Bt1b interlinking both the power feeding coil Lt1 and the power receiving coil Lr, which contribute to power transmission, from being canceled by the magnetic fluxes Bc1a to Bc1d generated by the first and second auxiliary coils Lc1a and Lc1b. As a result, a reduction in power transmission efficiency may be prevented or minimized.

In the power feeding coil unit Ltu1 according to this embodiment, moreover, the axes of the first and second auxiliary coils Lc1a and Lc1b are not aligned with the axis of the power feeding coil Lt1. The arrangement described above makes it difficult for the magnetic fluxes Bc1a to Bc1d generated by the first and second auxiliary coils Lo1a and Lc1b to interlink with the power feeding coil Lt1, preventing the magnetic fluxes Bt1a and Bt1b generated at the power feeding coil Lt1, which contribute to power transmission, from being canceled by the magnetic fluxes Bc1a to Bc1d generated by the first and second auxiliary coils Lc1a and Lc1b. As a result, a reduction in power transmission efficiency may be prevented or minimized.

Hereinafter, advantages achievable with this embodiment, which prevent or minimize a reduction in power transmission efficiency while reducing an unwanted leakage magnetic field formed in a location away from a power feeding coil, will be specifically described with reference to Example 1 and Comparative Examples 1 and 2.

In Example 1, the wireless power transmission device S1 according to the embodiment described above was used. In Comparative Example 1, for comparison with Example 1 in terms of characteristics, a wireless power transmission device configured such that the wireless power transmission device S1 does not include an auxiliary coil was used. In Comparative Example 2, for comparison with Example 1 in terms of characteristics, a wireless power transmission device configured such that a noise canceling coil Ln20 that interlinks with the magnetic flux created by a power feeding coil is added to Comparative Example 1 was used.

Figure 4:
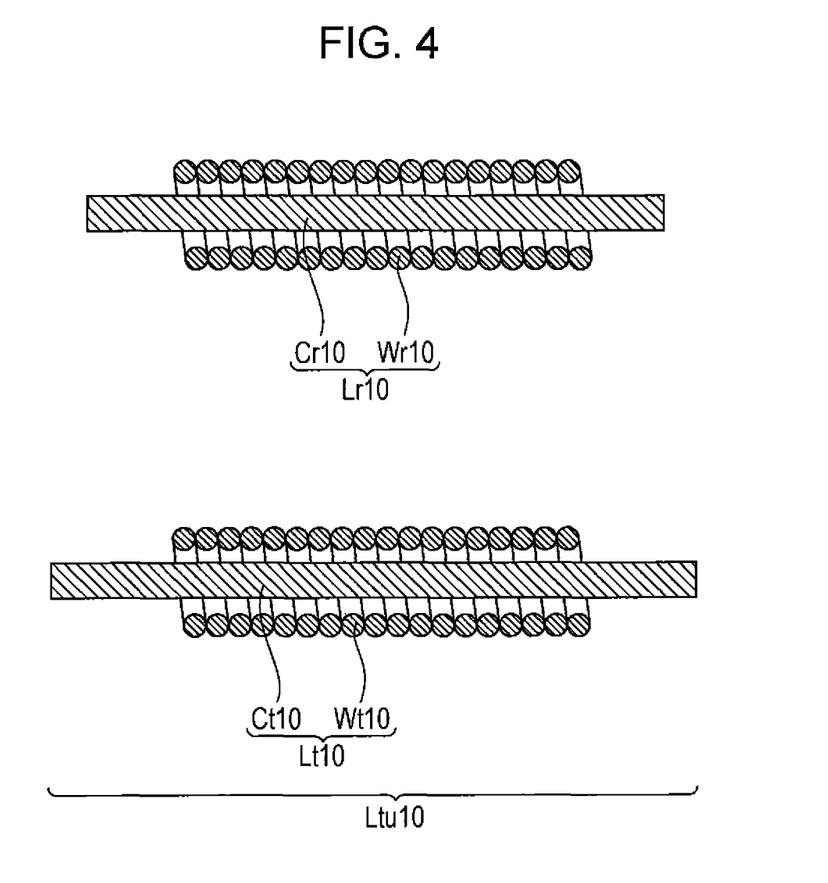
FIG. 4 is a cross-sectional view illustrating a power feeding coil unit in Comparative Example 1 together with a power receiving coil.

First, the configuration of a power feeding coil unit Ltu10 and a power receiving coil Lr10 in the wireless power transmission device in Comparative Example 1 will be described with reference to FIG. 4. FIG. 4 is a cross-sectional view illustrating the power feeding coil unit in Comparative Example 1 together with a power receiving coil. The power feeding coil unit Ltu10 in Comparative Example 1 includes a power feeding coil Lt10. The power feeding coil Lt10 is a solenoid coil wound in a helical shape, and is formed by, as illustrated in FIG. 4, winding a wire Wt10 around a magnetic core Ct10. The power feeding coil unit Ltu10 in Comparative Example 1 is equivalent to a configuration in which the first auxiliary coil Lc1a and the second auxiliary coil Lc1b are excluded from the power feeding coil unit Ltu1 of the wireless power transmission device 31 in Example 1. The power receiving coil Lr10 is a solenoid coil wound in a helical shape, and is formed by winding the wire Wr10 around the magnetic core Cr10, which is shaped into a plate or a bar. The power receiving coil Lr10 in Comparative Example 1 is similar to the power receiving coil Lr in Example 1.

Figure 5:
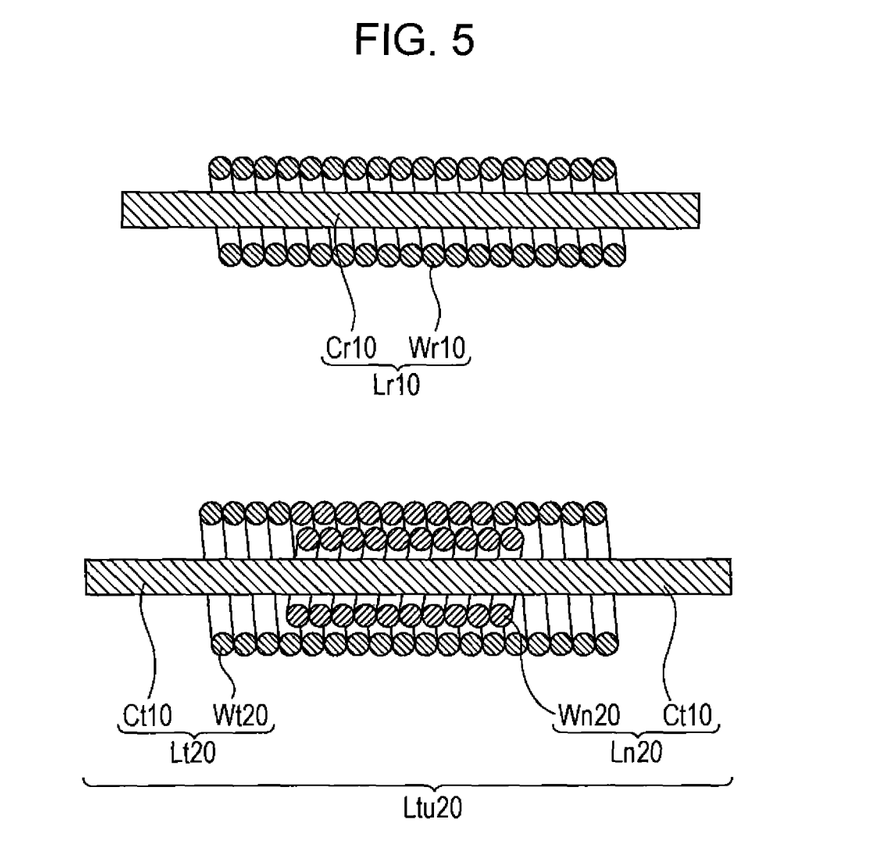
FIG. 5 is a cross-sectional view illustrating a power feeding coil unit in Comparative Example 2 together with a power receiving coil.

Next, the configuration of a power feeding coil unit Ltu20 and a power receiving coil Lr10 in the wireless power transmission device in Comparative Example 2 will be described with reference to FIG. 5. FIG. 5 is a cross-sectional view illustrating the power feeding coil unit in Comparative Example 2 together with a power receiving coil. The power feeding coil unit Ltu20 includes a power feeding coil Lt20 and a noise canceling coil Ln20. The power feeding coil unit Ltu20 in Comparative Example 2 is equivalent to a configuration in which the noise canceling coil Ln20 is added to the power feeding coil unit Ltu10 in Comparative Example 1. The noise canceling coil Ln20 is a solenoid coil wound in a helical shape, and is configured such that, as illustrated in FIG. 5, a wire Wn20 of the noise canceling coil Ln20 is wound around the magnetic core Ct10 and a wire Wt20 of the power feeding coil Lt20 is further wound on the outer surface of the noise canceling coil Ln20. The configuration described above allows the noise canceling coil Ln20 to interlink with the magnetic flux created by the power feeding coil Lt20. Here, the noise canceling coil Ln20 is wound in a direction opposite to the direction in which the power feeding coil Lt20 is wound. In addition, the power receiving coil Lr10 is a solenoid coil wound in a helical shape, and is formed by winding a wire Wr10 around a magnetic core Cr10 shaped into a plate or a bar. The power receiving coil Lr10 in Comparative Example 2 is similar to the power receiving coil Lr in Example 1.

Here, in Example 1 and Comparative Examples 1 and 2, a Litz wire with a diameter of approximately 6 mm which is formed by twisting approximately 4000 polyimide-coated copper wires each having a diameter of 0.05 mm was used for each of the wires Wt1, Wt10, and Wt20 of the power feeding coils Lt1, Lt10, and Lt20, the wires Wc1a and Wc1b of the first and second auxiliary coils Lc1a and Lc1b, the wire Wn20 of the noise canceling coil Ln20, and the wires Wr and Wr10 of the power receiving coils Lr and Lr10. In addition, ferrite cores of the same material (with a relative magnetic permeability of approximately 3000) were used for the magnetic cores Ct1 and Ct10 of the power feeding coils Lt1, Lt10, and Lt20, the magnetic cores Cc1a and Cc1b of the first and second auxiliary coils Lc1a and Lc1b, and the magnetic cores Cr and Cr10 of the power receiving coils Lr and Lr10.

Furthermore, in the power feeding coil unit Ltu1 in Example 1, the magnetic core Ct1 of the power feeding coil Lt1 having a length of 300 mm, a width of 300 mm, and a thickness of 15 mm, the magnetic cores Cc1a and Cc1b of the first and second auxiliary coils Lc1a and Lc1b each having a length of 60 mm, a width of 300 mm, and a thickness of 15 mm, and the magnetic core Cr of the power receiving coil Lr having a length of 300 mm, a width of 300 mm, and a thickness of 10 mm were used. In the power feeding coil unit Ltu10 in Comparative Example 1 and the power feeding coil unit Ltu20 in Comparative Example 2, the magnetic core Ct10 of the power feeding coils Lt10 and Lt20 having a length of 300 mm, a width of 300 mm, and a thickness of 15 mm, and the magnetic core Cr10 of the power receiving coil Lr10 having a length of 300 mm, a width of 300 mm, and a thickness of 10 mm were used.

Moreover, the number of turns of each coil in Example 1 and Comparative Examples 1 and 2 was set in accordance with Table 1 below.

TABLE 1

|  | Number of turns | | |
|---|---|---|---|
|  | Example 1 | Comparative Example 1 | Comparative Example 2 |
| Power feeding coil | 20 turns | 20 turns | 20 turns |
| First and second auxiliary coils | 10 turns × 2 | No coil | No coil |
| Noise canceling coil | No coil | No coil | 20 turns |
| Power receiving coil | 10 turns | 10 turns | 10 turns |

In each of Example 1 and Comparative Examples 1 and 2, the distance between the power feeding coil unit and the power receiving coil was set to 150 mm.

Then, in Example 1 and Comparative Examples 1 and 2, the power transmission efficiency and the unwanted leakage magnetic field were measured. This measurement was conducted with no displacement of the power receiving coil, that is, with the distance between the power feeding coil unit and the power receiving coil being kept at 150 mm while the distance between the center of the power receiving coil and the center of the power feeding coil unit was also 150 mm. The supply power of the power source PW was adjusted so that the power to be supplied to the load R became equal to 3 kW.

The power transmission efficiency was measured as follows: The efficiency between the power feeding coil unit and the power receiving coil was calculated by measuring the power supplied from the power source PW and the power supplied to the load R while taking into account the loss at the inverter INV and the loss at the rectifier circuit DB, which were measured in advance.

The unwanted leakage magnetic field was determined using, as an index, the magnetic field strength at a position 10 m away from the center of the power feeding coil unit. A loop antenna was placed at a position 10 m away from the center of the power feeding coil unit in the axial direction of the power receiving coil to measure a magnetic field strength. Here, the loop antenna was used to measure the magnetic field strengths in three orthogonal directions (X, Y, and Z directions), and the magnetic field strengths were combined to calculate a leakage magnetic field strength. Note that the power feeding coil unit was placed at a height of 500 mm from the floor surface with a power transmitting surface thereof facing upward, and the power receiving coil was placed above the power feeding coil unit with an interval of 150 mm between them. In addition, the loop antenna was placed in such a manner that the center of the loop antenna was positioned at a height of 1.5 m from the floor of a radio-frequency (RF) anechoic chamber.

Figure 6:
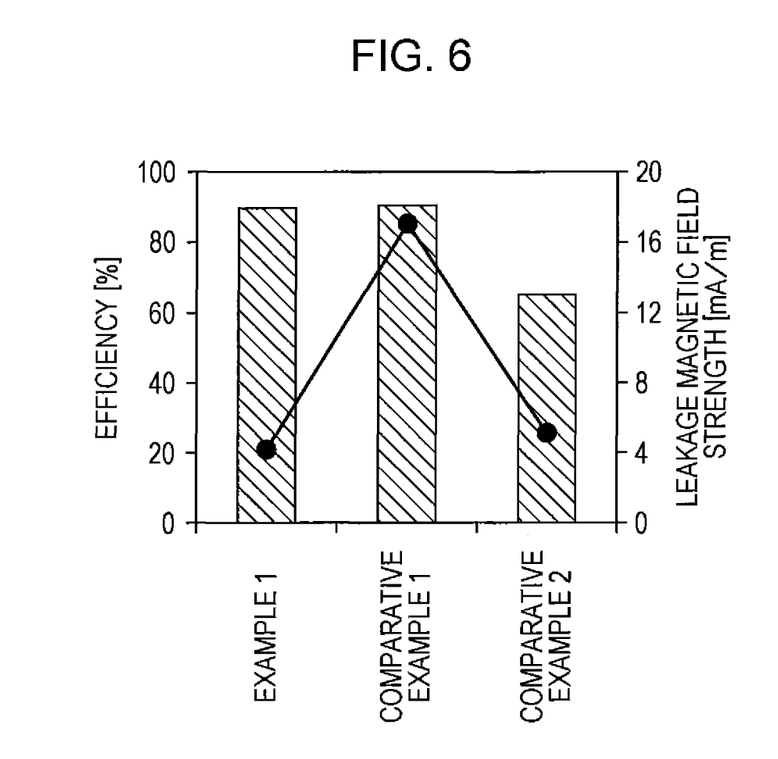
FIG. 6 depicts the results of measurement of the power transmission efficiency and the leakage magnetic field strength in Example 1 according to the present invention and Comparative Examples 1 and 2.

Measurement results are shown in FIG. 6. FIG. 6 depicts the results of the measurement in Example 1 and Comparative Examples 1 and 2. In FIG. 6, a bar graph depicts power transmission efficiency, and a line graph depicts leakage magnetic field strength.

The results of the measurement in Example 1 and Comparative Examples 1 and 2 will be examined. As illustrated in FIG. 6, compared to Comparative Example 1, Example 1 exhibits substantially equal power transmission efficiency and lower leakage magnetic field strength. In addition, compared to Comparative Example 2, Example 1 exhibits higher power transmission efficiency and substantially equal leakage magnetic field strength. The auxiliary coil in Example 1 (i.e., the first and second auxiliary coils Lc1$a$ and Lc1$b$) does not cancel out a magnetic flux contributing to power transmission, and thus a reduction in power transmission efficiency is prevented, compared to Comparative Example 1 in which no auxiliary coil is provided. Specifically, it is contemplated that Joule heating generated by a small parasitic resistance of the auxiliary coil will have caused a slight increase in loss. In Example 1, furthermore, the auxiliary coil cancels out a magnetic flux that forms the unwanted leakage magnetic field, and thus the leakage magnetic field strength is significantly reduced, compared to Comparative Example 1 in which no auxiliary coil is provided. In Comparative Example 2, in contrast, it is contemplated that both the power transmission efficiency and the leakage magnetic field strength will have been reduced by the noise canceling coil (the noise canceling coil Ln20) canceling out both a magnetic flux that contributes to power transmission and a magnetic flux that forms the unwanted leakage magnetic field. In the manner described above, it has been found that the power feeding coil unit Ltu1 in Example 1 is capable of preventing or minimizing a reduction in power transmission efficiency while reducing the unwanted leakage magnetic field. Accordingly, the effectiveness of the embodiments disclosed herein has been demonstrated.

The present invention has been described with reference to an embodiment thereof. Such an embodiment is illustrative, and it is to be understood by a person skilled in the art that various modifications and changes can be made within the scope of the present invention and that such modifications and changes also fall within the scope of the present invention. Accordingly, the description given herein and the drawings taken in conjunction therewith are to be illustrative but not restrictive.

What is claimed is:

1. A power feeding coil unit for wirelessly feeding power, comprising:
   a power feeding coil having a wire wound in a helical shape; and
   a first auxiliary coil and a second auxiliary coil, each of the first auxiliary coil and the second auxiliary coil having a wire wound in a helical shape, wherein
   the first auxiliary coil and the second auxiliary coil are arranged so that the wire of the first auxiliary coil and the wire of the second auxiliary coil do not overlap the wire of the power feeding coil when viewed from a direction perpendicular to an axial direction of the power feeding coil,
   a direction of circulation of a magnetic flux generated by the first auxiliary coil and a magnetic flux generated by the second auxiliary coil are opposite to a direction of circulation of a magnetic flux generated by the power feeding coil, and
   an axis of the first auxiliary coil and an axis of the second auxiliary coil are nonparallel to a power feeding direction of the power feeding coil, and are not aligned with an axis of the power feeding coil.

2. The power feeding coil unit according to claim 1, wherein
   the axis of the first auxiliary coil and the axis of the second auxiliary coil are substantially perpendicular to the power feeding direction of the power feeding coil.

3. The power feeding coil unit according to claim 1, wherein
   the first auxiliary coil and the second auxiliary coil are located on a rear side of the power feeding coil.

4. The power feeding coil unit according to claim 1, wherein
   the power feeding coil includes a magnetic core, and each of the first auxiliary coil and the second auxiliary coil includes a magnetic core,
   the magnetic core of the first auxiliary coil is coupled to the magnetic core of the power feeding coil, and
   the magnetic core of the second auxiliary coil is coupled to the magnetic core of the power feeding coil.

* * * * *